Patented June 4, 1929.

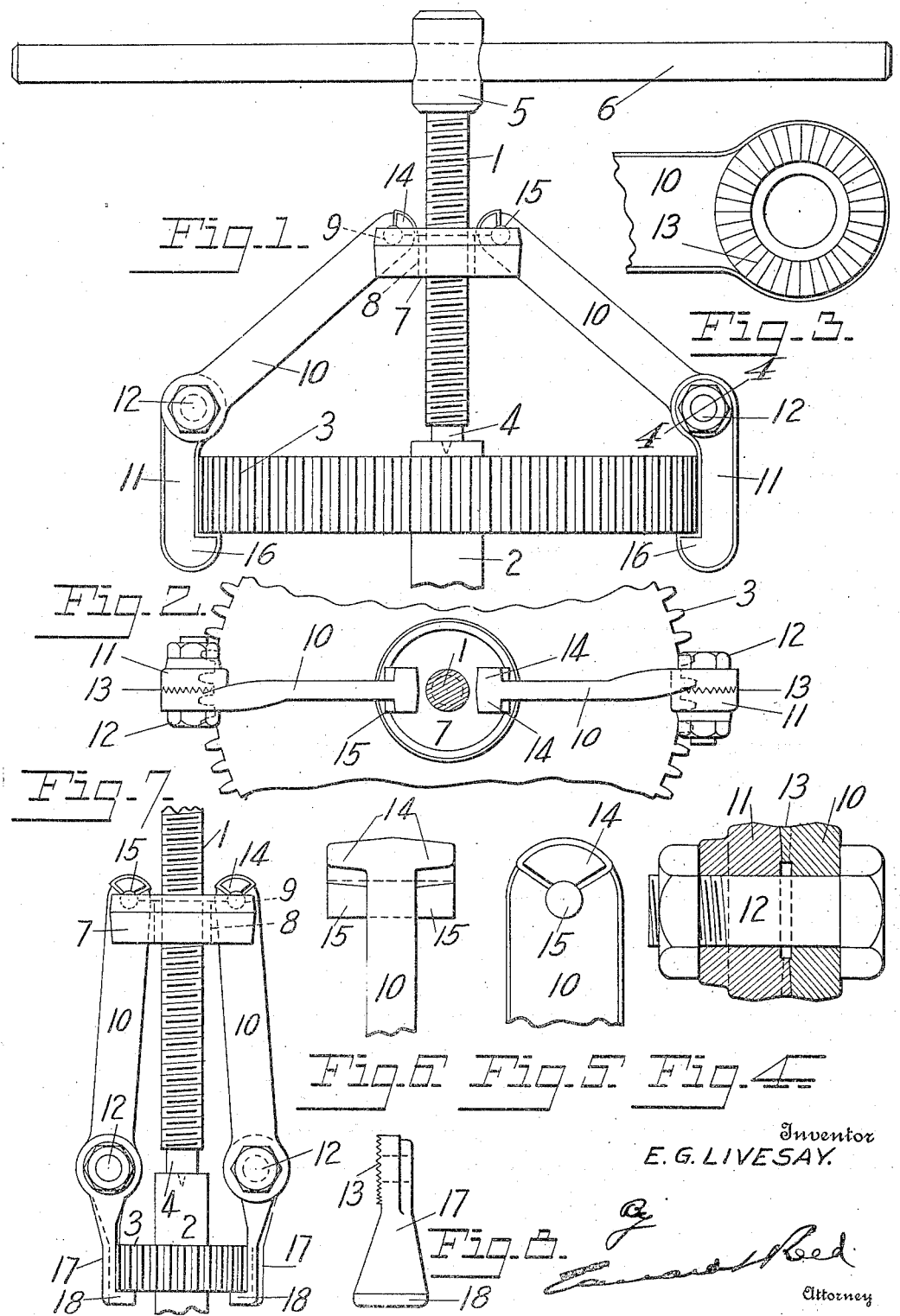

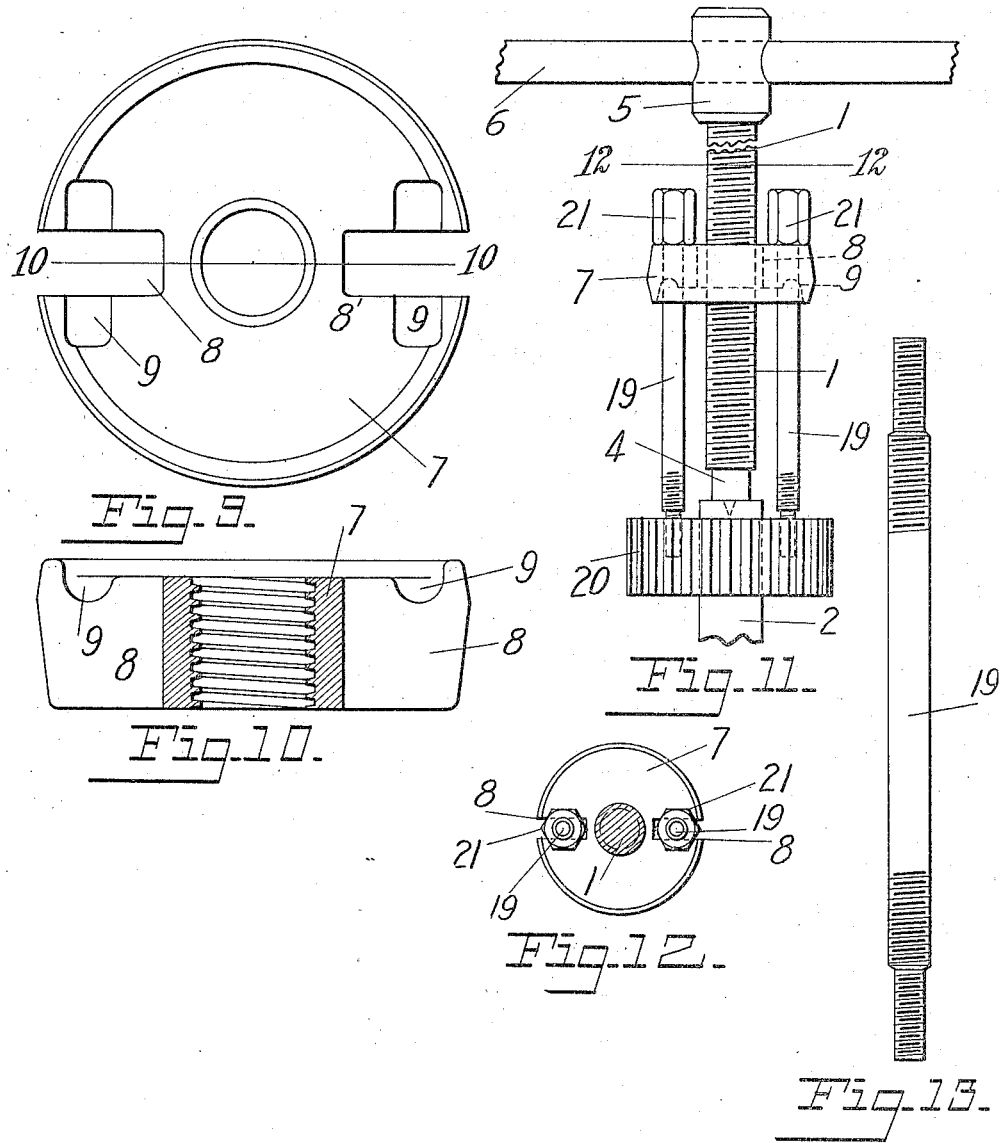

1,715,506

UNITED STATES PATENT OFFICE.

EVERETT G. LIVESAY, OF DAYTON, OHIO.

GEAR PULLER.

Application filed May 19, 1926. Serial No. 110,278.

This invention relates to gear pullers and is designed more particularly for removing gears, disks, wheels and the like from the shafts or spindles on which they are mounted.

One object of the invention is to provide a mechanism of this character which will exert a very powerful pull upon the gear in a direction substantially parallel with its axis.

A further object of the invention is to provide such a mechanism with a plurality of connecting devices adapted to be interchangeably attached thereto to accommodate the mechanism to gears of various sizes, shapes and locations.

A further object of the invention is to provide such an invention which will be simple in its construction and operation and of such a character that it can be quickly and easily applied to the gear which is to be pulled.

Other objects of the invention will appear as the mechanism is described in detail.

In the accompanying drawings Fig. 1 is a side elevation of a gear puller embodying my invention; Fig. 2 is a plan view of the mechanism shown in Fig. 1, with the screw in section and the gear partly broken away; Fig. 3 is a detail view of a portion of one arm of one of the connecting members; Fig. 4 is a section taken on the line 4—4 of Fig. 1; Fig. 5 is a detail view of one end of one of the connecting members showing the means for attaching the same to the operating head; Fig. 6 is an edge view of that portion of the device shown in Fig. 5; Fig. 7 is a side elevation of a gear puller having a slightly modified form of connecting member; Fig. 8 is a detail view of one arm of one of the connecting member of Fig. 7; Fig. 9 is a plan view of the operating head; Fig. 10 is a sectional view of the operating head taken on the line 10—10 of Fig. 9; Fig. 11 is a side elevation of a gear puller; partly broken away, showing another of the connecting devices; Fig. 12 is a section taken on the line 12—12 of Fig. 11; and Fig. 13 is a detail view of one of the connecting rods of the mechanism of Fig. 11.

In these drawings I have illustrated one embodiment of my invention and have shown the same as provided with three connecting devices adapted to be interchangeably attached thereto and serving to connect the same with gears of various kinds and sizes, but it will be understood that the mechanism as a whole, as well as the various parts thereof, may take different forms without departing from the spirit of the invention.

As here illustrated the gear puller comprises a screw 1 adapted to engage the end of a shaft 2 upon which is mounted a gear 3 which is to be pulled. The screw extends in axial alinement with the shaft and is preferably provided at its inner end with a center point 4 arranged to enter the center opening which is usually found in the end of the shaft. Any suitable means may be utilized for rotating the screw. As here shown, its outer end is enlarged at 5 and provided with a transverse aperture to receive an operating bar 6, which may be removably mounted therein. Mounted on the screw is an operating head 7 which, in the operation of the mechanism, is held against rotation so that the rotation of the screw will cause the head to travel lengthwise thereof. This operating head has a plurality of openings therethrough and, in the present arrangement, there are two openings in the form of radial slots 8 arranged on diametrically opposite sides of the screw and opening through the peripheral edge of the head. The outer surface of the head has formed therein bearing recesess 9 which are arranged on opposite sides of the respective slots 8.

Means are provided for connecting the operating head 7 with the gear or other device which is to be pulled and inasmuch as the gears which are to be pulled take a great variety of shapes and sizes and are located in many different positions I have provided a plurality of connecting devices which may be interchangeably attached to the head 7 so as to accommodate the mechanism to a relatively large variety of gears. In that form of the mechanism shown in Figs. 1 to 8 the connecting device comprises a plurality of connecting members, in the present instance two, each comprising an outer arm 10 having means for attaching it to the operating head 7 and an inner arm 11 having means to operatively engage the gear which is to be pulled. The two arms are rigidly connected one to the other but are adjustable with relation one to the other so that they may be arranged in such angular positions as will enable the inner arms 11 to extend substantially parallel with the axis of the gear. For this purpose the adjacent ends of the two arms, 10 and 11, overlap and are provided with apertures to receive a bolt 12 by means of which they are rigidly connected one to the other. Preferably the overlapping ends of the two arms are enlarged to form disks and the contacting faces of the disks are serrated or provided with teeth, as shown at 13, which, when the two arms are clamped together by the bolt 12, will be held in interlocking engagement and will rigidly retain the two arms against movement with relation one to the other. The outer arm 10 of each connecting member is adapted to fit within one of the slots 8 of the operating head and has laterally extending portions to engage the outer surface of the head and retain the arm within the slot. In the present construction these projections have portions constituting trunnions which are seated in the bearing recesses 9. The laterally extending lugs are here shown as formed integral with the arms 10, by forging or otherwise, and extending laterally in opposite directions from the end thereof, as shown at 14. The inner edges of the lugs are inclined toward the longitudinal center of the arm and the inner portions thereof constitute the trunnions. Preferably the trunnions comprise a hardened pin 15 driven through a suitable opening in the arm at the inner edges of the lugs 14 and of a length co-extensive with the length of the lugs. Thus while the trunnions are formed separately from the lugs they constitute in effect a part thereof and are firmly braced against the integral portions of the lugs. Because of the inclined edges of the lugs the arms can be moved to various positions with relation to the operating head without displacing the trunnions, as shown in Figs. 1 and 7.

The inner arms 11 may be provided with means of any suitable character for engaging the gear. As shown in Fig. 1 each arm 11 has a laterally extending nose or hook 16 to engage the inner side of the gear. Some gears are so located with relation to the other parts of the mechanism that a hook of the character shown in Fig. 1 cannot be placed in engagement therewith and in Fig. 7 I have shown the inner arms 11 as comprising plates 17 curved to fit about the peripheral contour of the gear, each plate having at its inner end a flange or lip 18 to overlap and engage the inner face of the gear. When a gear is to be removed the screw 1 is placed against the end of the shaft, the two connecting members are inserted in the openings 8 with their trunnions seated in the recesses 9, and the hook shaped ends of the connecting members are engaged about the gear. The screw is then rotated and inasmuch as the head 7 is held against rotation by the connecting members it will be caused to move lengthwise of the screw. The two connecting members being rigid throughout their length and the inner portions thereof extending parallel with the axis of the gear it will be apparent that the pull thereon will be in a direction substantially parallel with the axis of the gear. The screw being of a diameter at least no greater than the diameter of the shaft the gear may be pulled entirely off the end of the shaft.

Certain types of gear, such as the timer gears of automobile engines, are so arranged with relation to their associated mechanism it is not feasible to place a hook of any kind about the same and it is customary to provide these gears with screw threaded sockets in their outer faces to receive an implement by means of which they may be removed. In Figs. 11, 12 and 13, I have shown that form of connecting device utilized for removing a gear of this type. As there shown, the connecting device comprises two rods 19 screw threaded at their inner ends to enable the same to be inserted in the screw threaded sockets of the gear 20, extending outwardly along the screw 1 and through the openings 8 in the operating head 7, and having enlarged portions, such as nuts 21, at their outer ends to engage the outer side of the head and thus retain the rods in the openings of the head. It will be noted that the head 7 is provided with a shallow flange on that side thereof having the bearing recesses 9 and, as shown in Fig. 11, the head is placed on the screw in an inverted position so that the enlargements or nuts 21 will engage the flat surface of the head on opposite sides of the slots 8. Inasmuch as the screw threaded sockets may be of different sizes and their threads of different pitches in different gears I have shown the rods 19 as having both ends reduced in diameter and screw threaded and as having the adjacent portions of the body of the gear screw threaded. If desired, the threads of the different ends of the rod may be of different pitch. Thus the rod can be connected with a variety of gears having sockets of different sizes and threads of different kinds. In this form of connecting device also the arrangement is such that the pull is exerted upon the gear along a line substantially parallel with the axis thereof.

The operation of the mechanism will be readily understood from the foregoing description and it will be apparent that the several connecting devices are interchangeable and that anyone of these devices may be quickly and easily attached to the operating head by placing the outer portion thereof in overlapping engagement with the head. The inner portions of the connecting members are placed in operative engagement with the gear and the screw then rotated to move the operating head outwardly, thus drawing the gear from its shaft.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A gear puller comprising a screw adapted to engage the end of a shaft, a means for rotating said screw, an operating head mounted on said screw and having radial slots extending through the edges thereof and bearing recesses arranged on opposite sides of the respective slots, and connecting members each comprising an arm adapted to extend through one of said slots and having oppositely extending trunnions to engage the respective bearing recesses, each of said connecting members also comprising a second arm having means to operatively engage a gear to be pulled, and means to rigidly connect said arms one to the other in different angular positions.

2. A gear puller comprising a screw adapted to engage the end of a shaft, means for rotating said screw, an operating head mounted on said screw, having an outwardly extending peripheral flange, having slots through the peripheral edge thereof and having recesses in the outer face thereof adjacent to said slots, and connecting members adapted to extend through the respective slots and having laterally extending parts to enter the respective recesses, said connecting members also having other parts to operatively engage a gear on said shaft.

3. A gear puller comprising a screw adapted to engage the end of a shaft, means for rotating said screw, an operating head mounted on said screw, having slots opening through the edge thereof and recesses in the outer surface thereof adjacent to said slots, and connecting members adapted to extend through the respective slots in said head and each having laterally extending lugs which overlap said head and the inner portions of which are pivotally seated in the respective recesses to operatively support said connecting members in different angular positions with relation to said head, said connecting members also having means for operatively connecting the same with a gear on said shaft.

4. A gear puller comprising a screw adapted to engage the end of a shaft, means for rotating said screw, an operating head mounted on said screw and having bearing recesses in the outer face thereof, connecting members each comprising an outer arm having at its outer end a transverse portion to overlap the outer face of said head, said transverse portion having a part forming a trunnion to engage one of the bearing recesses and operatively connect said outer arm with said operating head either in a position substantially parallel with said screw or in a position oblique to said screw, each of said connecting members also comprising an adjustable inner arm having a part to engage a gear on said shaft, and means for rigidly connecting said arms one to the other in such relative positions that said inner arm will extend substantially parallel with said screw.

5. In a gear puller comprising a screw to engage the end of a shaft and connecting members to engage a gear on said shaft, a disk-like operating head having a central opening threaded to receive said screw and having radial slots extending through the peripheral edge thereof to receive said connecting members, said head having on one side thereof a peripheral flange, and recesses adjacent to the respective slots, and having its other face substantially flat.

In testimony whereof, I affix my signature hereto.

EVERETT G. LIVESAY.